United States Patent

Senanayake

[19]

[11] Patent Number: 6,089,021
[45] Date of Patent: Jul. 18, 2000

[54] POWER PRODUCTION PLANT AND METHOD OF MAKING SUCH A PLANT

[76] Inventor: Daya Ranjit Senanayake, 9 Ecrin Pl., Borella, Colombo 8, Sri Lanka

[21] Appl. No.: 09/142,632

[22] PCT Filed: Apr. 4, 1996

[86] PCT No.: PCT/IB96/00282

§ 371 Date: Jul. 6, 1999

§ 102(e) Date: Jul. 6, 1999

[87] PCT Pub. No.: WO96/31698

PCT Pub. Date: Oct. 10, 1996

[30] Foreign Application Priority Data

Apr. 6, 1995 [LK] Sri Lanka .................................. 10783

[51] Int. Cl.[7] ...................................................... F03G 6/00
[52] U.S. Cl. ...................................... 60/641.12; 60/641.15
[58] Field of Search .............................. 60/641.1, 641.8, 60/641.11, 641.12, 641.15; 290/1 R, 54, 55

[56] References Cited

U.S. PATENT DOCUMENTS

| 4,159,629 | 7/1979 | Korr et al. ........................... 60/641.15 |
| 4,452,046 | 6/1984 | Valentin ................................. 60/641.1 |
| 4,856,281 | 8/1989 | Taylor .................................... 60/641.9 |
| 5,395,598 | 3/1995 | Prueitt ................................. 60/641.9 X |
| 5,608,268 | 3/1997 | Senanayake ..................... 60/641.12 X |

*Primary Examiner*—Hoang Nguyen
*Attorney, Agent, or Firm*—Flanagan & Flanagan; John R. Flanagan; John K. Flanagan

[57] ABSTRACT

This invention relates to a power production plant (10) and method. The power production plant includes a chimney (12), a conduit (18) in the chimney, the conduit having an inlet and an outlet, and a solar energy collector (30) having an outlet connected to the chimney characterised by the solar collector output being connected to the inlet of the conduit, by a rotor (50) in the said outlet, and by the conduit being offset from the central axis (A) of the chimney. The provision of a conduit in the chimney allows the plant to be constructed in stages, and to permit power output before full completion of the plant.

4 Claims, 2 Drawing Sheets

POWER PRODUCTION PLANT AND METHOD OF MAKING SUCH A PLANT

FIELD OF THE INVENTION

This invention relates to a power production plant and method. Although the plant is intended primarily for electrical power generation using solar energy, it can be operated by other energy sources e.g. geothermal and/or wind, and can have other uses e.g. the drying of articles by creating an airflow thereover.

The method of the invention will have greatest utility for the manufacture of a large scale power generation plant, to produce for instance over 110 MW of electricity, for local or national consumption, or for export.

In this specification terms such as upper and lower are to be understood in relation to the gravitational direction.

BACKGROUND TO THE INVENTION

Many power production plants, for example for the production of electricity for a national grid, rely on the continuous use of non-renewable resources such as coal, oil or natural gas, which have to be transported to the plant.

Other power production plants, for example hydroelectric power plants, can only be sited where there is a natural or artificial head of water, and this water head may not be available, or convenient to provide. There is no satisfactory means to check whether the plant will perform to, specification until after completion.

Power plants are costly to build. To recoup the investment, power needs to be produced and sold, but with the known construction methods a power plant will not produce power until completed, which for the larger plants of 200 MW or more may be three or more years after construction begins. Because of the long "pay back" period, those ordering a new power plant could be reluctant to finance new technology which offers savings but which is unproven, and which cannot be proven until final building is complete.

DISCLOSURE OF PRIOR ART

A power production plant which includes a chimney having a central axis, a conduit in the chimney having an axis coincident with the said central axis of the chimney, the conduit having, an inlet and an outlet, and a solar energy collector having an outlet connected to chimney is disclosed in French patent publication 2,531,753. A turbine is located at the top of the chimney.

A power production plant which includes a chimney having a lower inlet mouth and an upper outlet mouth for inducing an air current into said lower inlet mouth, through said chimney and from said upper outlet mouth, and an engine mounted on the chimney, with means for driving the engine by the air current, is disclosed in British patent publication 2,055,980A. There is a rotor to drive the engine, the rotor having its axis horizontal and parallel to the air current.

DISCLOSURE OF THE INVENTION

We now propose a power production plant which includes a chimney, a conduit in the chimney, the conduit having an inlet and an outlet, and a solar energy collector having an outlet connected to the chimney characterised by the solar collector output being connected to the inlet of the conduit, by a rotor in said outlet and by the conduit being offset from the central axis of the chimney. The rotor will be wind driven, and preferably is part of a cased, horizontal axis, pressure-staged wind turbine.

Because the conduit is offset from the central axis of the chimney, one or more additional conduits can be located in the chimney, each having an inlet connected to the outlet of a respective solar energy collector.

An advantage of the invention is that there can be power generation when the first collector and conduit are assembled, without need to wait for power generation until the second and additional collector/conduit sets are installed; furthermore the power output of the power generation plant can be controlled in accordance with the number of collector/conduit sets installed, up to a maximum determined by the diameter (and also perhaps height) of the chimney.

We also propose a method of making a power production plant which includes the steps of building a chimney about a central axis, installing a conduit in the chimney, the conduit having an inlet and an outlet, positioning a solar energy collector which has an air inlet and an air outlet so that the air outlet is connected to the said chimney characterised by connecting the air outlet to the chimney inlet, by fitting a rotor in said air outlet so as to be rotated by air flowing into the chimney inlet, and by installing the conduit offset from said central axis. Preferably the solar collector extends radially from said central axis, and usefully has a width which increases with the distance from the axis so as to be sector-shaped, subtending at least three degrees and desirably at least ten degrees.

If the solar collector subtends ten degrees there could be thirty six similar collectors positioned around the chimney, and thirty six conduits installed within the chimney; however we prefer to limit the number of collectors and conduits to twenty. In one alternative embodiment when the last collector (number twenty) is in position ready for maximum solar chimney output, the nineteen conduits previously installed can be removed. In another alternative embodiment, when the last collector is in position ready for maximum solar chimney output, the nineteen rotors previously installed can be removed from the solar connectors, and one or more wind turbines located in the chimney.

It is a feature of the invention that the chimney is constructed initially of a diameter for the designed maximum power output. Thus the chimney foundations are constructed of a strength to accommodate any increase in the height of the chimney necessary to achieve staged increases of power output, up to the designed maximum power output (with allowance for the standard safety factors).

BRIEF DESCRIPTION OF EXEMPLARY EMBODIMENTS

The invention will be further described by way of example with reference to the accompanying drawings, in which FIG. 1 is a cross-section of a solar chimney according to the invention, with a single solar collector positioned radially with respect to the central axis of the chimney, and single conduit installed; with, in dotted outline the design shape and size for the completed chimney;

DISCLOSURE OF EXEMPLARY EMBODIMENTS

Figure 1:
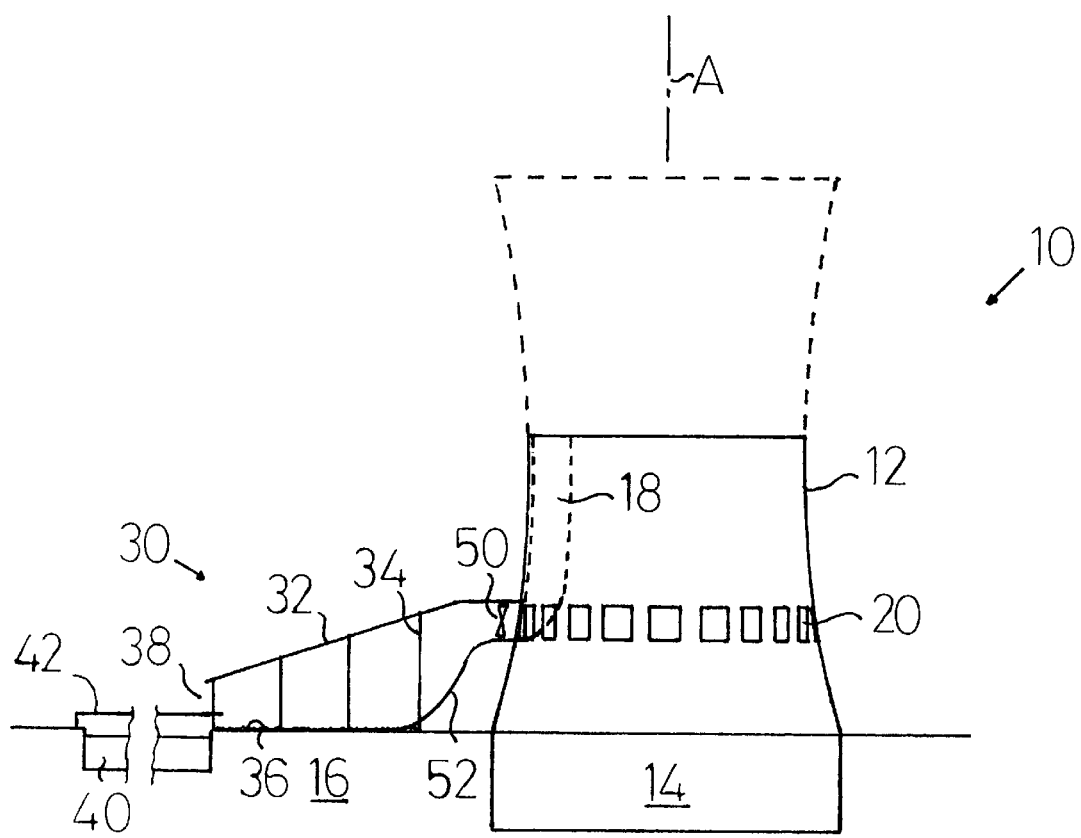

The solar power plant 10 of FIG. 1 is to provide an output of 200 MW (megawatts). However, after completion of stage 1 of the construction (as shown in FIG. 1) plant 10 has a capacity of (only) 1.75 MW, which nevertheless does represent a significant output of power which can be used on-site, or sold to help recoup building costs.

The arrangement proposed in this first embodiment is we believe suitable for a country or region having an average global solar radiation of 960 watts/sq.m and an average ambient air temperature of 30° C.

The design specification for a typical 200 MW plant for such country or region could require a chimney diameter of 250M, which we propose to construct during preliminary construction, as for a known power plant.

However the design specification for this specified power output could also require (a) a chimney height of 1000 m; (b) a solar collector area of 467 hectares (Ha); (c) a solar pond heat collector area of 9,300 Ha; and (d) thirty six pressure staged wind turbines, each of 5.5 MW capacity. We have now realised however that we can modify the plant design so that it is not necessary for all, or indeed any, of these requirements to be met before useful power can be obtained i.e. power can be produced at a time when there has been a relatively low capital expenditure i.e. a relatively low proportion of the capital expenditure which would otherwise need to be expended, even before the plant starts producing power e.g. electricity.

If conditions change and the plant is not to be completed to its full 200 MW rating, then the plant can continue to operate satisfactorily at a reduced rating.

Thus in known fashion chimney 12 is built to a height of 300 m upon foundations 14, which are sunk in ground 16 to the depth required to support the eventual full-height chimney. The chimney 12 has a base which is circular about central axis A, with in this embodiment a base diameter of 250 m which is the calculated diameter for a chimney suited to a power plant with a designed maximum output of 200 MW.

It is a feature of the invention that the full chimney diameter (in this embodiment 250 m) is not used for air up-flow during stage 1. Thus the chimney includes a conduit 18, for a purpose to be more fully described below, and positioned offset from axis A; in this embodiment conduit 18 is secured to the inside wall of the chimney.

A number of chimney inlets 20 are provided around the circumference of the chimney. As shown, each chimney inlet is square in cross-section, with an area corresponding to the area of the conduit 18 to which it is connected, or will be connected; in alternative embodiments the openings are circular or rectangular. The openings may be partly closed by an assembly having the required chimney inlet shape and size if this differs from the opening shape and size.

Each of the chimney inlets is initially sealed against the ingress of air. During construction the entrance to the first conduit 18 is connected to one selected chimney inlet 20, and the seal or cover for this chimney inlet is then removed.

Aligned with this selected chimney inlet 20 is a solar collector 30 of known design, suitably comprising a transparent roof 32 supported on metal uprights 34 and overlying a solar collector area 36 of rubble or darkened matting.

Ambient air can be drawn in through entrance 38, becoming heated before passing into the respective chimney inlet 20 and rising upwardly in conduit 18 before escaping to atmosphere.

The air flow in chimney 12 can be induced not only by a temperature difference between upper and lower chimney levels, but also by a barometric difference and by external wind. These effects are enhanced in an alternative embodiment wherein the height of chimney 12 is increased to a dimension as shown in dotted outline. In an alternative embodiment the chimney is of gradually reducing external diameter with increasing height.

The first solar collector 30 will preferably be constructed at a position such that its entrance 38 faces into the prevailing wind.

The solar collector 30 in this embodiment has a transparent covered area of 12.9 Ha, and cooperates with a solar pond collector area 40 of an area of 465 Ha, formed as a moat around the area designated for the solar collectors, and covered by a canopy 42.

Figure 4:
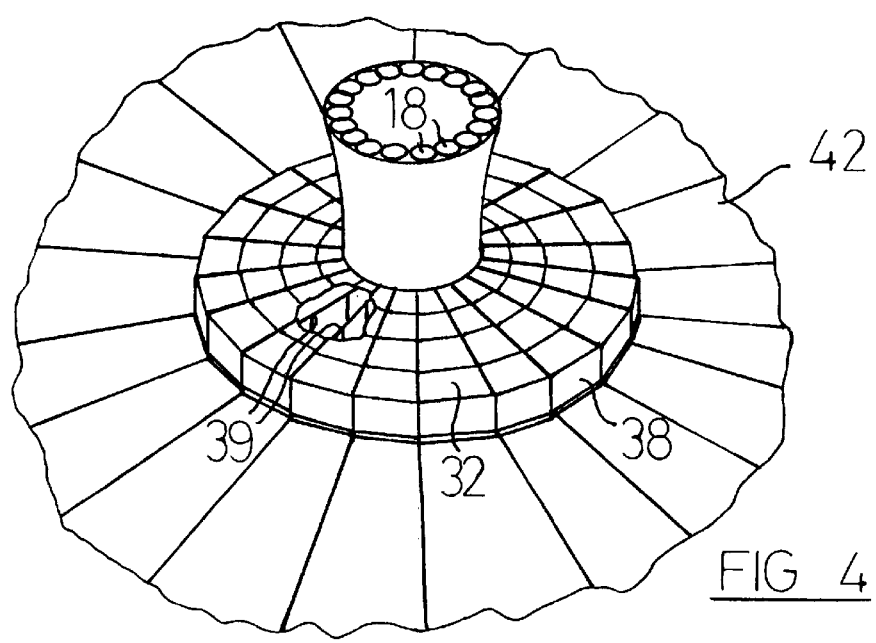
FIG. 4 is a perspective view of a completed power production plant according to the invention.

The completed solar power plant of FIG. 4, which comprises twenty solar collectors 30 and solar pond collector areas 40, has a (rubble or matting) covered area of 258 Ha and a pond area of 9,300 Ha. However, in alternative embodiments differently-sized solar collectors (and ponds) are used, and in further alternative embodiments solar collectors and ponds subtending different angles are used.

Figure 2:
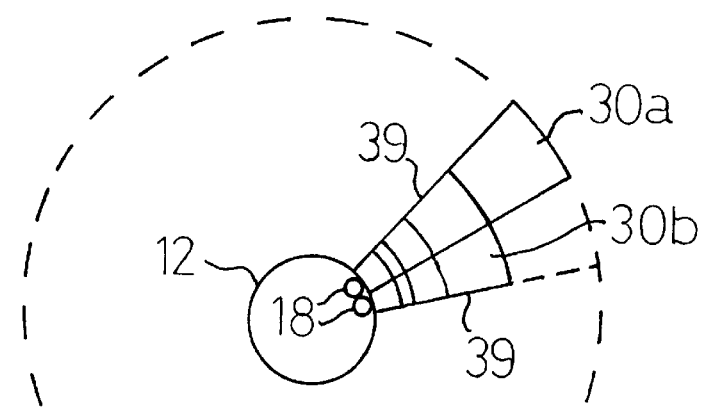
FIG. 2 is a plan view of the solar chimney of FIG. 1 but with a second collector in position, and a second conduit installed.
Figure 3:
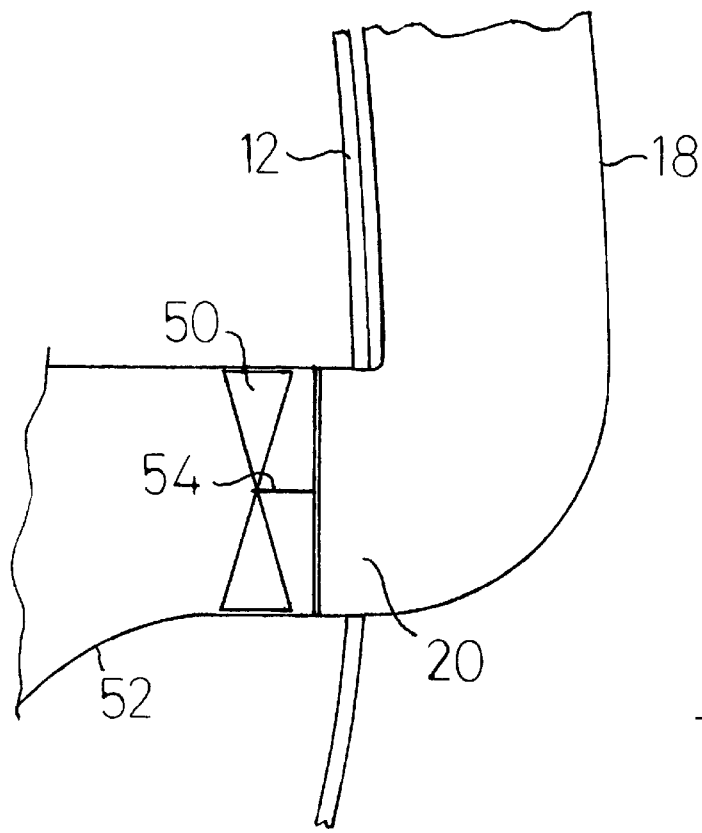
FIG. 3 is a cross-section of a wind turbine in a solar collector, with air flow controls.

As seen in FIG. 2, the stage 1 solar collector 30a is complete, and operational; the stage 2 solar collector 30b is under construction, requiring a final section of roof. However, in some locations, it may be desirable to operate the solar collector 30b in the condition of FIG. 2, so that the (reduced) area of solar collector 30b can be used to produce electricity prior to the final section of roof being fitted. Thus, it is possible that some users would prefer to build a circumferential ring of solar collectors, but each of reduced (or "incomplete") roof area, the roof area being later increased as and when desired.

Although the air current can be used for various industrial purposes, usefully the solar collector 30 houses a wind turbine 50 which is supported upon axle 54, and which is positioned 165 m from axis A. In this embodiment the wind turbine 50 has two blades sweeping a cross sectional area of 490 sq.m. and with a rated capacity of 5.5 Mw., though in alternative embodiments the turbine could have four or more blades. However the output of wind turbine 50 is artificially limited at stage 1 to 1.75 Mw. so that its solar collector does not have to be constructed to the designed full size before first wind turbine 50 can become operational.

With a chimney diameter of 250 m. and a cross-sectional area of about 49000 sq.m., then to use a wind turbine 50 with blades of only 490 sq.m. swept area is against existing design rules; thus there will be a sudden decompression of air inside chimney 12, which in turn will result in a reduction in the air flow rate, and a lowering of the pressure drop across the blades to such an extent that the blades may not start to rotate, or if rotating may slow to a halt. To overcome this, the exit from the wind turbine 50 is connected to a chimney inlet 20, and as an important feature of the invention therefore to a conduit 18.

The air flow to a wind turbine 50 is determined in part by the size and shape of its dedicated solar collector 30. In stage 1, only a single collector 30 is constructed, of wedge or segmental shape, radiating out from chimney 12 and with closed sides 39, as by the use of side covers. As seen in FIG. 4 the side covers 39 can usefully be left in position even in the fully-assembled condition of solar chimney 10, acting to separate the air flow to the wind turbines 50 in order that these can individually be taken out of service for maintenance or replacement (without the solar chimney needing to be shut down), and if rigid as is preferred help to support roof 32.

In a preferred embodiment as shown, the volume of air flowing towards the wind turbine 50 is controlled by a shutter movable across collector entrance 38, permitting the wind turbine to begin operation before completion of the solar collector to its full size. However, all,of this air volume may not produce useful work. Thus if the wind turbine is mounted in a case having a square or rectangular periphery, some of the air volume will impinge upon the case. Furthermore, if the case is not surrounded by a closure structure preventing the flow of air around the turbine e.g. between the turbine and one or more of the collector roof 32, the side covers 39, and ground 16 (which together define the collector air flow passageway, perhaps of 625 sq.m.), then there will be a further diminution of available air flow energy. Thus as a further feature of the invention we provide a cowl 52 connected to the inlet of the wind turbine and having an internal surface which gradually and smoothly merges from a cross section substantially equivalent to that of the collector air flow passageway (e.g. 625 sq.m.) to that of the inlet of the wind turbine (e.g. 490 sq.m.) in order that all or substantially all of the air entering the solar collector 30 can flow in a laminar stream and with minimum frictional losses into and through the turbine 50.

The outlet from turbine 50 is adjacent chimney inlet 20, but in an alternative embodiment conduit 18 can have its lower end sized and shaped to be supported by the respective inlet 20, with a terminal conduit end cooperating directly with the turbine outlet so as to prevent dissipation of the air flow.

As seen in FIG. 4, subsequently the solar chimney can be "completed" by the addition of further collectors 30, whereby to permit the full designed power output, together with further conduits 18 (some of which can be tied to the chimney wall and others to existing conduits, with one conduit if necessary lying along axis A). If even greater output is subsequently required e.g. some years after stage 1 had been completed, then perhaps an upward extension could be built to chimney 12 e.g. to a height as indicated in dotted outline; and with such an increased chimney height if desired another array of collectors could be added above collector roof 32, each collector having its own turbine. Entrance 38 can now be opened fully, as by removal of the shutter or equivalent.

An important advantage of the method is that a small scale plant can be commissioned, whilst allowing a large scale plant (exceeding 200 mw for electrical power generation) to be obtained by adding to the small scale plant in stages, perhaps over several years. The large scale plant could we forsee complete effectively with plants using gas turbines, diesel turbines, and coal fired plants which use non-renewable energy sources, which energy sources may furthermore not be locally available in countries having suitable solar radiation and wind levels for optimum use of the invention.

What is claimed is:

1. A power production plant which includes a chimney, a conduit in the chimney, the conduit having an inlet and an outlet, and a solar energy collector having an outlet connected to the chimney characterised by the solar collector output being connected to the inlet of the conduit, by a rotor in said outlet, and by the conduit being offset from the central axis of the chimney.

2. A method of making a power production plant which includes the steps of building a chimney about a central axis, installing a conduit in the chimney, the conduit having an inlet and an outlet, positioning a solar energy collector which has an air inlet and an air outlet so that the air outlet is connected to the said chimney characterised by connecting the air outlet to the conduit inlet, by fitting a rotor in said air outlet so as to be rotated by air flowing into the conduit inlet, and by installing the conduit offset from said central axis.

3. A method as claimed in claim 2 in which the height of the chimney is increased, and in which extra conduits are fitted in the chimney, each conduit being connected to a solar collector having a wind turbine.

4. A method as claimed in claim 3 in which the conduits are removed when the height of the chimney has been increased tenfold.

* * * * *